T. J. SMITH.
WHEEL FOR VEHICLES.
No. 109,465.                              Patented Nov. 22, 1870.
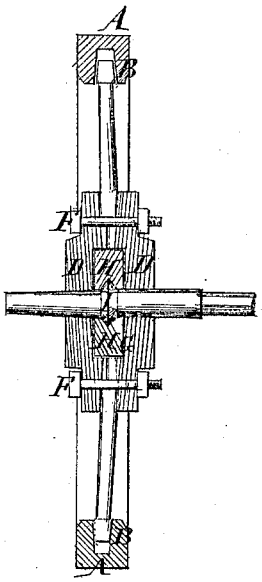
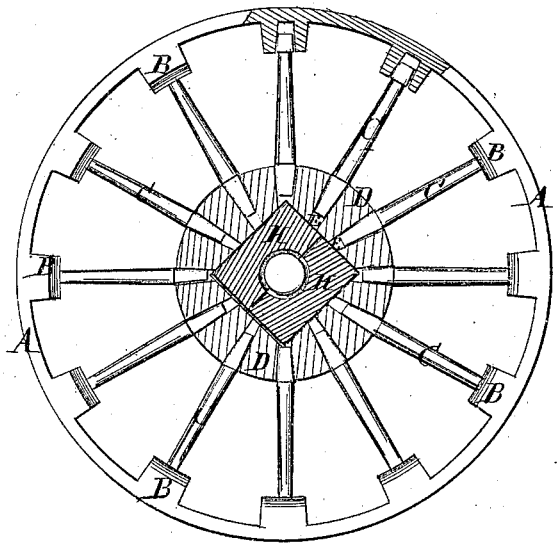

United States Patent Office.

THOMAS JORDAN SMITH, OF CORNERSVILLE, MISSISSIPPI.

Letters Patent No. 109,465, dated November 22, 1870.

IMPROVEMENT IN WHEELS FOR VEHICLES.

The Schedule referred to in these Letters Patent and making part of the same.

*To all whom it may concern:*

Be it known that I, THOMAS JORDAN SMITH, of Cornersville, in the county of Pontotoc and State of Mississippi, have invented a new and improved Vehicle-Wheel; and I do hereby declare that the following is a full, clear, and exact description thereof, which will enable others skilled in the art to make and use the same, reference being had to the accompanying drawing forming part of this specification.

This invention relates to improvements in the construction of vehicle-wheels; and It consists in making a cast-metal rim with socketed lugs on the inside for the ends of the spokes; also, in making the hubs of two disks with recesses which form sockets for the other ends of the spokes when the two disks are bolted together; and also in providing detachable bearing-blocks for the axle in recesses in the center of the hubs, the said bearings having a V or other formed groove receiving a corresponding collar on the axle, which prevents end movement of the axle in the wheel.

The said improvements are also applicable to spinning and other wheels.

Figure 1 is a transverse sectional elevation of my improved wheel, and

Figure 2 is a side view, sectioned through the hub and a part of the rim.

Similar letters of reference indicate corresponding parts.

A represents the cast-metal rim, and B the socketed lugs thereon for the reception of the outer ends of the spokes C. These are formed in the usual manner, of casting, and the sockets are suitably tapered, so that the spokes which are first driven into them may be wedged in tightly.

D represents the disks which constitute the hubs. They are also cast, and have the tapered radial recesses E, which form sockets where the two disks are joined for the inner ends of the spokes, which are laid in sidewise to the recesses of one disk previous to the application of the other, which is laid on and then clamped up by bolts F.

These disks also have large central recesses G, preferably of angular form, in which the bearings H for engaging the collar I on the axle fit, the said bearings being designed to prevent end movement of the wheel on the axle. The axle also bears at each side of the collar in the disks.

The collar is preferably made in the V-form represented, but it may be in any other shape which will answer the purpose.

This hub may be used either with the metallic rim here represented, or with the common wood fellies and iron tires.

Having thus described my invention,

I claim as new and desire to secure by Letters Patent—

1. The tire A and spoke-sockets B, formed in one piece, as and for the purpose described.

2. The disks D, having recesses E G, the grooved bearings H, and collared axle I, all combined as described, and for the purpose set forth.

THOMAS JORDAN SMITH.

Witnesses:
W. H. LEACH,
I. W. BARBER.